United States Patent
Lauer et al.

(10) Patent No.: US 11,580,080 B2
(45) Date of Patent: Feb. 14, 2023

(54) METHODS AND APPARATUS FOR CROSS-CHECKING THE RELIABILITY OF DATA

(71) Applicant: HERE Global B.V., Eindhoven (NL)

(72) Inventors: Johannes Lauer, Eschborn (DE); Till Kraft, Frankfurt (DE)

(73) Assignee: HERE Global B.V., Eindhoven (NL)

( * ) Notice: Subject to any disclaimer, the term of this patent is extended or adjusted under 35 U.S.C. 154(b) by 118 days.

(21) Appl. No.: 16/239,753

(22) Filed: Jan. 4, 2019

(65) Prior Publication Data

US 2020/0218704 A1 Jul. 9, 2020

(51) Int. Cl.
*G06F 16/215* (2019.01)
*G06F 16/2458* (2019.01)
*G06F 16/2457* (2019.01)

(52) U.S. Cl.
CPC ........ *G06F 16/215* (2019.01); *G06F 16/2471* (2019.01); *G06F 16/24575* (2019.01)

(58) Field of Classification Search
CPC ............... G06F 16/215; G06F 16/2471; G06F 16/24575; G06F 16/29; G06F 16/387; G06F 16/487; G06F 16/587; G06F 16/687; G06F 16/787; G06F 16/909; G06Q 10/063112
See application file for complete search history.

(56) References Cited

U.S. PATENT DOCUMENTS

| | | |
|---|---|---|
| 8,996,523 B1 | 3/2015 | Fisher |
| 2008/0215524 A1 | 9/2008 | Fuchs et al. |
| 2010/0198503 A1* | 8/2010 | Beckner ................. G06F 16/29 701/408 |
| 2011/0087662 A1* | 4/2011 | Darby, Jr. .............. G06Q 50/08 707/736 |
| 2013/0045738 A1* | 2/2013 | Chen .................... H04W 76/18 455/433 |
| 2013/0046738 A1 | 2/2013 | Kuo et al. |

(Continued)

OTHER PUBLICATIONS

Roche, Stephane, Eliane Propeck-Zimmermann, and Boris Mericskay. "GeoWeb and crisis management: Issues and perspectives of volunteered geographic information." GeoJournal 78, No. 1 (2013): 21-40. (Year: 2013).*

(Continued)

*Primary Examiner* — Jesse P Frumkin
(74) *Attorney, Agent, or Firm* — Alston & Bird LLP

(57) ABSTRACT

An apparatus and methods are provided to cross-check the reliability of data. Referring to one of the methods, the cross-checking includes receiving a client request containing data in the form of geographic-related information associated with a location. The method also includes determining one or more knowledge providers to determine one or more confidence levels for the data of the client request based on a type of the geographic-related information at the specific location. The method further includes causing the transmission of at least some of the geographic-related information the client request to the one or more knowledge providers. The method still further includes determining one or more confidence levels of the geographic-related information based on a comparison of the geographic-related information and a known resource associated the specific location. A corresponding apparatus and additional method are also provided.

20 Claims, 3 Drawing Sheets

(56) References Cited

U.S. PATENT DOCUMENTS

| | | | |
|---|---|---|---|
| 2013/0159040 A1* | 6/2013 | Sarmenta | G06Q 10/06 463/43 |
| 2013/0170752 A1* | 7/2013 | Ramnath Krishnan | G06F 16/632 382/182 |
| 2013/0262530 A1* | 10/2013 | Collins | G06F 16/22 707/812 |
| 2013/0275170 A1 | 10/2013 | Kern et al. | |
| 2014/0280277 A1 | 9/2014 | Tucker et al. | |
| 2015/0254986 A1 | 9/2015 | Fairfield et al. | |
| 2016/0147826 A1* | 5/2016 | Mishra | G01C 21/32 707/736 |
| 2016/0314127 A1* | 10/2016 | Har-Noy | G06Q 10/101 |
| 2016/0364427 A1* | 12/2016 | Wedgeworth, III | G06F 16/27 |
| 2019/0004532 A1 | 1/2019 | Ferguson et al. | |
| 2019/0347353 A1* | 11/2019 | Lawlor | G06F 16/215 |
| 2020/0110817 A1* | 4/2020 | Viswanathan | G06F 16/285 |

OTHER PUBLICATIONS

Bakillah, M. et al., *Semantic Interoperability of Sensor Data with Volunteered Geographic Information: A Unified Model*, ISPRS Int. J. Geo-Inf, 2 (2013) 766-796.

Foody, G. et al., *Increasing the Accuracy of Crowdsourced Information on Land Cover via a Voting Procedure Weighted by Information Inferred From the Contributed Data*, ISPRS Int. J. Geo-Inf. 7, 80 (2018) 12 pages.

Souza, W.D. et al., *DM4VGI: A Template With Dynamic Metadata for Documenting and Validating the Quality of Volunteered Geographic Information*, Proceedings of XIV Geoinfo, Campos do Jordão, Brazil (Nov. 24-27, 2013) 12 pages.

Extended European Search Report for Application No. EP 19 21 7973 dated Apr. 14, 2020, 7 pages.

Office Action for European Application No. 19217973.7 dated Jul. 14, 2021, 6 pages.

Office Action for European Application No. 19217973.7 dated Apr. 29, 2022, 52 pages.

* cited by examiner

METHODS AND APPARATUS FOR CROSS-CHECKING THE RELIABILITY OF DATA

TECHNOLOGICAL FIELD

An example embodiment relates generally to methods and an associated apparatus for cross-checking the reliability of data and, more particularly, to methods and an associated apparatus for cross-checking the reliability of data collected by vehicles on the road, edited by volunteers or generated by, e.g., algorithms.

BACKGROUND

Crowd-sourced data has been integral to the advancement of technology in recent years. However, data collected is only as useful as it can be verified that it is accurate. Put more precisely, in order to create reliable information from crowd-sourced data, there must be some way to verify, at least to some degree, that the data is correct. While this verification can be done manually by users, there are as of yet few automated methods of cross-checking the reliability of data. Therefore, data aggregators who rely on crowd-sourced data must either use large amounts of resources to verify this data or trust the users providing the data, which increases the risk that the information is inaccurate. One current method of crowd-sourcing is volunteered geographic information (VGI), in which the reliability of the data is only verified by users. VGI usage can be problematic as the user may not be informed as to how to accurately determine the reliability of the data, or the accuracy determination by the user may be incorrect for a number of other reasons. Data aggregators that use VGI, or other types of user verified geographic information, are only as reliable as the data they receive from the users and due to the unknown reliability of individual users, the overall reliability of the aggregated data is also in question.

BRIEF SUMMARY

Methods and an apparatus are provided in accordance with example embodiments in order to cross-check the reliability of data in an efficient and accurate manner. As crowd-sourced data becomes more prevalent and computerized data aggregation advances, the need to cross-check geographic-related information obtained may help the effectiveness and efficiencies of any person or machine that relies on the data aggregation. Aggregated data is only as reliable as the underlying data and therefore being able to cross-check the reliability of data allows for easier, more efficient data aggregation. The methods and apparatus of an example embodiment assist clients of different types to determine the reliability of geographic-related information based on existing geographic-related information.

In an example embodiment, a method is provided for cross-checking reliability of data. The method includes receiving a client request containing data in the form of geographic-related information associated with a specific location. The method also includes identifying one or more knowledge providers to determine one or more confidence levels for the data of the client request based on a type of the geographic-related information associated with the specific location. The method further includes causing the transmission at least some of the geographic-related information of the client request to the one or more knowledge providers. The method still further includes determining one or more confidence levels of the geographic-related information based on a comparison of the geographic-related information and a known resource associated with the specific location by the one or more knowledge providers.

In some embodiments, the determination of the one or more confidence levels includes comparing the one or more confidence levels to one another to determine a combined confidence level. The method of some embodiments also includes causing the transmission of a signal based on the one or more confidence levels. The signal is based on the one or more confidence levels includes the combined confidence level. In some embodiments, the one or more knowledge providers includes a primary knowledge provider which provides an initial confidence level of the geographic-related information.

In an example embodiment, the method also includes receiving, from at least one of the one or more knowledge providers, information indicating one or more types of geographic-related information for which the one or more knowledge providers are capable of creating a confidence level. In some embodiments, the information also identifies one or more locations for which the at least one of the one or more knowledge providers are capable of creating the confidence level. In other embodiments, the one or more knowledge providers are pipelines or repositories.

In another example embodiment, an apparatus is provided for cross-checking the reliability of data that comprises at least one processor and at least one non-transitory memory including computer program code instructions stored thereon with the computer program code instructions configured to, when executed by the at least one processor, cause the apparatus to receive a client request containing data in the form of geographic-related information associated with a specific location. The computer program code instructions are also configured to, when executed by the at least one processor, cause the apparatus to identify one or more knowledge providers to determine one or more confidence levels for the data of the client request based on a type of the geographic-related information associated with the specific location. The computer program code instructions are further configured to, when executed by the at least one processor, cause the apparatus to cause the transmission at least some of the geographic-related information of the client request to the one or more knowledge providers. The computer program code instructions are still further configured to, when executed by the at least one processor, cause the apparatus to determine one or more confidence levels of the geographic-related information based on a comparison of the geographic-related information and a known resource associated with the specific location by the one or more knowledge providers.

In some embodiments, the determination of the one or more confidence levels includes comparing the one or more confidence levels to one another to determine a combined confidence level. The apparatus of some embodiments is also caused to cause the transmission of a signal based on the one or more confidence levels. The signal is based on the one or more confidence levels includes the combined confidence level. In some embodiments, the one or more knowledge providers includes a primary knowledge provider which provides an initial confidence level of the geographic-related information.

In an example embodiment, the apparatus is also caused to receive, from at least one of the one or more knowledge providers, information indicating one or more types of geographic-related information for which the one or more knowledge providers are capable of creating a confidence level. In some embodiments, the information also identifies one or more locations for which the at least one of the one or more knowledge providers are capable of creating the confidence level. In other embodiments, the one or more knowledge providers are pipelines or repositories.

In an example embodiment, a computer program product is provided for cross-checking reliability of data that comprises at least one non-transitory computer-readable storage medium having computer-executable program code instructions stored therein with the computer-executable program code instructions comprising program code instructions configured to receive a client request containing data in the form of geographic-related information associated with a specific location. In an example embodiment, the computer program instructions are also configured to identify one or more knowledge providers to determine one or more confidence levels for the data of the client request based on a type of the geographic-related information associated with the specific location. In an example embodiment, the computer program instructions are further configured to cause the transmission at least some of the geographic-related information of the client request to the one or more knowledge providers. In an example embodiment, the computer program instructions are still further configured to determine one or more confidence levels of the geographic-related information based on a comparison of the geographic-related information and a known resource associated with the specific location by the one or more knowledge providers.

In some embodiments, the determination of one or more confidence levels includes comparing the one or more confidence levels to one another to determine a combined confidence level. In an example embodiment, the computer program code instructions are further configured to cause the transmission of a signal based on the one or more confidence levels. The signal based on the one or more confidence levels includes the combined confidence level. In some embodiments, the one or more knowledge providers include a primary knowledge provider which provides an initial confidence level of the geographic-related information.

In an example embodiment, the computer program code instructions are further configured to receive, from at least one of the one or more knowledge providers, information indicating one or more types of geographic-related information for which the one or more knowledge providers are capable of creating a confidence level. In some embodiments, the information also identifies one or more locations for which the at least one of the one or more knowledge providers are capable of creating the confidence level. In other embodiments, the one or more knowledge providers are pipelines or repositories.

In a further example embodiment, an apparatus is provided for cross-checking reliability of data that includes means for receiving a client request containing data in the form of geographic-related information associated with a specific location. The apparatus also includes means for identifying one or more knowledge providers to determine one or more confidence levels for the data of the client request based on a type of the geographic-related information associated with the specific location. The apparatus further includes means for causing the transmission at least some of the geographic-related information of the client request to the one or more knowledge providers. The apparatus still further includes means for determining one or more confidence levels of the geographic-related information based on a comparison of the geographic-related information and a known resource associated with the specific location by the one or more knowledge providers.

In some embodiments, the determination of the one or more confidence levels includes comparing the one or more confidence levels to one another to determine a combined confidence level. The apparatus of some embodiments also includes means for causing the transmission of a signal based on the one or more confidence levels. The signal is based on the one or more confidence levels includes the combined confidence level. In some embodiments, the one or more knowledge providers includes a primary knowledge provider which provides an initial confidence level of the geographic-related information.

In an example embodiment, the apparatus also includes means for receiving, from at least one of the one or more knowledge providers, information indicating one or more types of geographic-related information for which the one or more knowledge providers are capable of creating a confidence level. In some embodiments, the information also identifies one or more locations for which the at least one of the one or more knowledge providers are capable of creating the confidence level. In other embodiments, the one or more knowledge providers are pipelines or repositories.

In an example embodiment, a method is provided for cross-checking reliability of data. The method includes receiving a client request containing a geographic-related information associated with a specific location. The method also includes coupling with at least one knowledge provider to transmit data. The at least knowledge provider provides information defining a data profile for which the at least one knowledge providers is able to create a confidence level. The method further includes causing the transmission of the geographic-related information to at least one of the at least one knowledge provider coupled with the confirmation gateway based on the data profile provided from each knowledge provider.

In an example embodiment, the confidence level provided by at least one knowledge provider is compared to one another to determine a combined confidence level. In some embodiments, the method also includes providing the client with information relating to one or more confidence levels determined by at least one knowledge provider. The information provided to the client relating to one or more confidence levels includes the combined confidence level. In some embodiments, the at least one knowledge provider comprises a primary knowledge provider which provides an initial confidence level of the geographic-related information.

In an example embodiment, the method also includes providing the client with information relating to one or more confidence levels determined by the at least one of the at least one knowledge provider. In some embodiments, the information received from the knowledge providers also includes one or more locations for which the at least one of the at least one knowledge provider can create the confidence level.

In another example embodiment, an apparatus is provided for cross-checking reliability of data that comprises at least one processor and at least one non-transitory memory including computer program code instructions stored thereon with the computer program code instructions configured to, when executed by the at least one processor, cause the apparatus to receive a client request containing a geographic-related information associated with a specific location. The computer program code instructions are also configured to, when executed by the at least one processor, cause the apparatus to couple with at least one knowledge provider to transmit data. In such embodiments, the at least one knowledge provider provides information to assist in the coupling process. The information provided by the at least one knowledge provider may include defining a data profile for which the at least one knowledge providers is able to create a confidence level. The computer program code instructions are further configured to, when executed by the at least one processor, cause the apparatus to cause the transmission of the geographic-related information to at least one of the at least one knowledge provider coupled with the confirmation gateway based on the data profile provided from each knowledge provider.

In an example embodiment, the confidence level provided by at least one knowledge provider is compared to one another to determine a combined confidence level. In some embodiments, the computer program code instructions are also configured to, when executed by the at least one processor, cause the apparatus to provide the client with information relating to one or more confidence levels determined by at least one knowledge provider. The information provided to the client relating to one or more confidence levels includes the combined confidence level. In some embodiments, the at least one knowledge provider comprises a primary knowledge provider which provides an initial confidence level of the geographic-related information.

In an example embodiment, the computer program code instructions are also configured to, when executed by the at least one processor, cause the apparatus to provide the client with information relating to one or more confidence levels determined by the at least one of the at least one knowledge provider. In some embodiments, the information received from the knowledge providers also includes one or more locations for which the at least one of the at least one knowledge provider can create the confidence level.

In a further example embodiment, a computer program product is provided for cross-checking reliability of data that comprises at least one non-transitory computer-readable storage medium having computer-executable program code instructions stored therein with the computer-executable program code instructions comprising program code instructions configured to receive a client request containing a geographic-related information associated with a specific location. The program code instructions are also configured to couple with at least one knowledge provider to transmit data. The at least knowledge provider provides information defining a data profile for which the at least one knowledge providers is able to create a confidence level. The program code instructions are further configured to cause the transmission of the geographic-related information to at least one of the at least one knowledge provider coupled with the confirmation gateway based on the data profile provided from each knowledge provider.

In an example embodiment, the confidence level provided by at least one knowledge provider is compared to one another to determine a combined confidence level. In some embodiments, the program code instructions are also configured to provide the client with information relating to one or more confidence levels determined by at least one knowledge provider. The information provided to the client relating to one or more confidence levels includes the combined confidence level. In some embodiments, the at least one knowledge provider comprises a primary knowledge provider which provides an initial confidence level of the geographic-related information.

In an example embodiment, the program code instructions are also configured to provide the client with information relating to one or more confidence levels determined by the at least one of the at least one knowledge provider. In some embodiments, the information received from the knowledge providers also includes one or more locations for which the at least one of the at least one knowledge provider can create the confidence level.

In yet another example embodiment, an apparatus is provided for cross-checking reliability of data that includes means for receiving a client request containing a geographic-related information associated with a specific location. The apparatus also includes means for coupling with at least one knowledge provider to transmit data. The at least knowledge provider provides information defining a data profile for which the at least one knowledge providers is able to create a confidence level. The apparatus further includes means for causing the transmission of the geographic-related information to at least one of the at least one knowledge provider coupled with the confirmation gateway based on the data profile provided from each knowledge provider.

In an example embodiment, the confidence level provided by at least one knowledge provider is compared to one another to determine a combined confidence level. In some embodiments, the apparatus also includes means for providing the client with information relating to one or more confidence levels determined by at least one knowledge provider. The information provided to the client relating to one or more confidence levels includes the combined confidence level. In some embodiments, the at least one knowledge provider comprises a primary knowledge provider which provides an initial confidence level of the geographic-related information.

In an example embodiment, the apparatus also includes means for providing the client with information relating to one or more confidence levels determined by the at least one of the at least one knowledge provider. In some embodiments, the information received from the knowledge providers also includes one or more locations for which the at least one of the at least one knowledge provider can create the confidence level.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
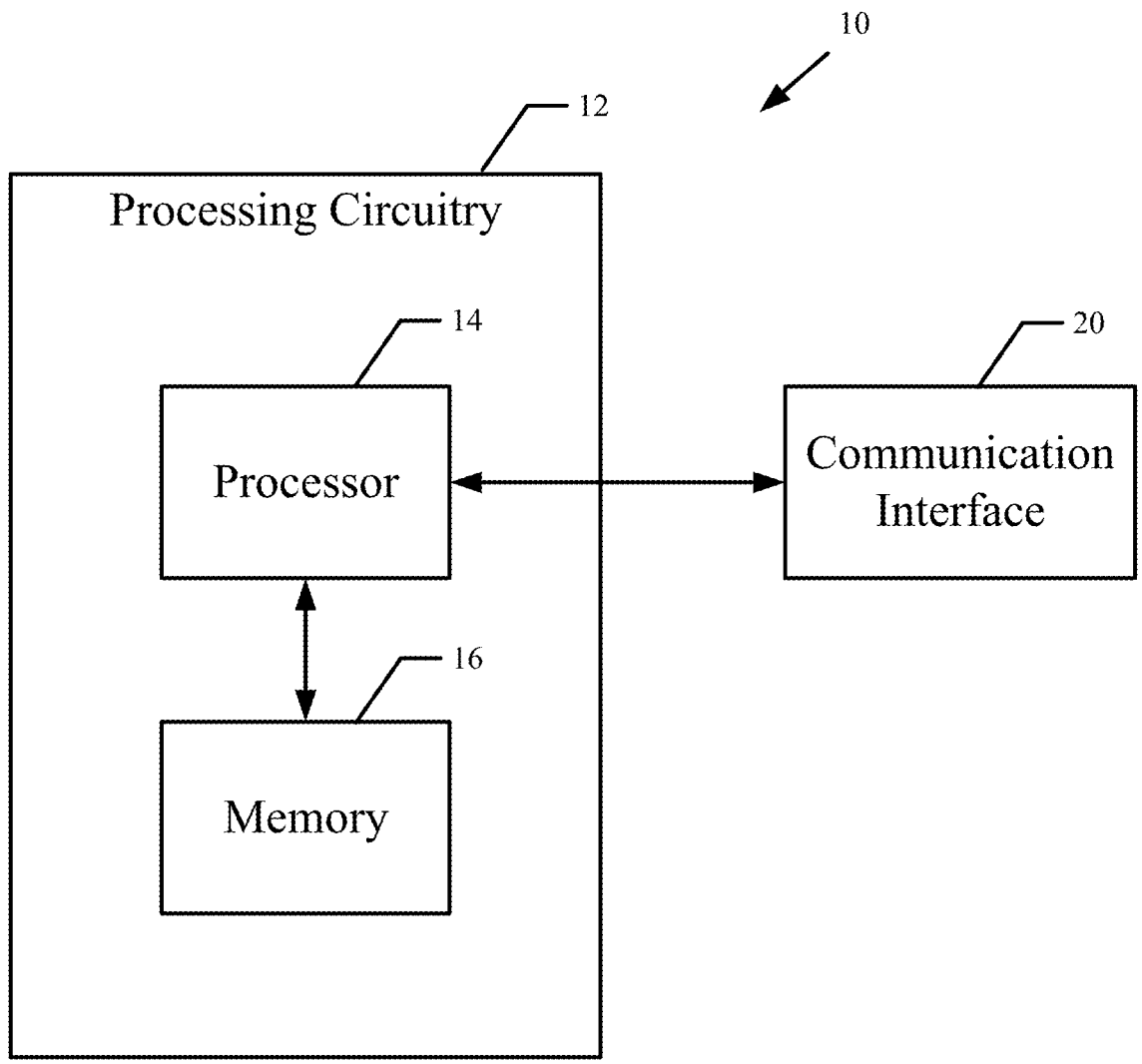
Figure 2:
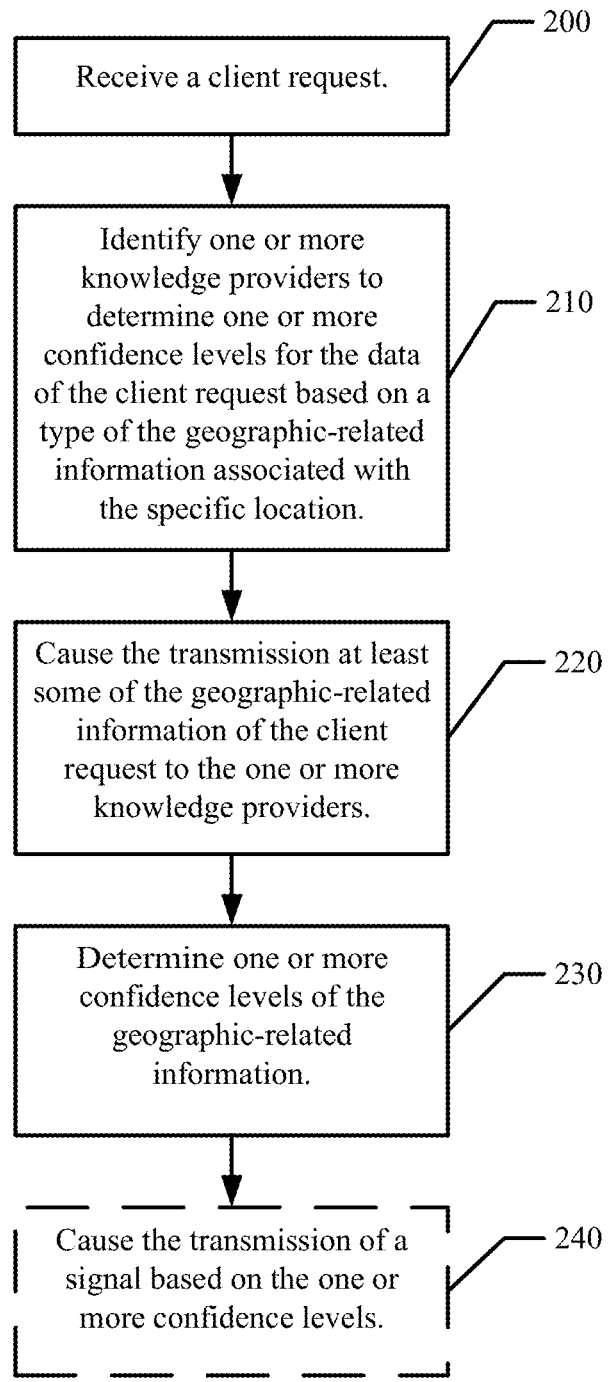
Figure 3:
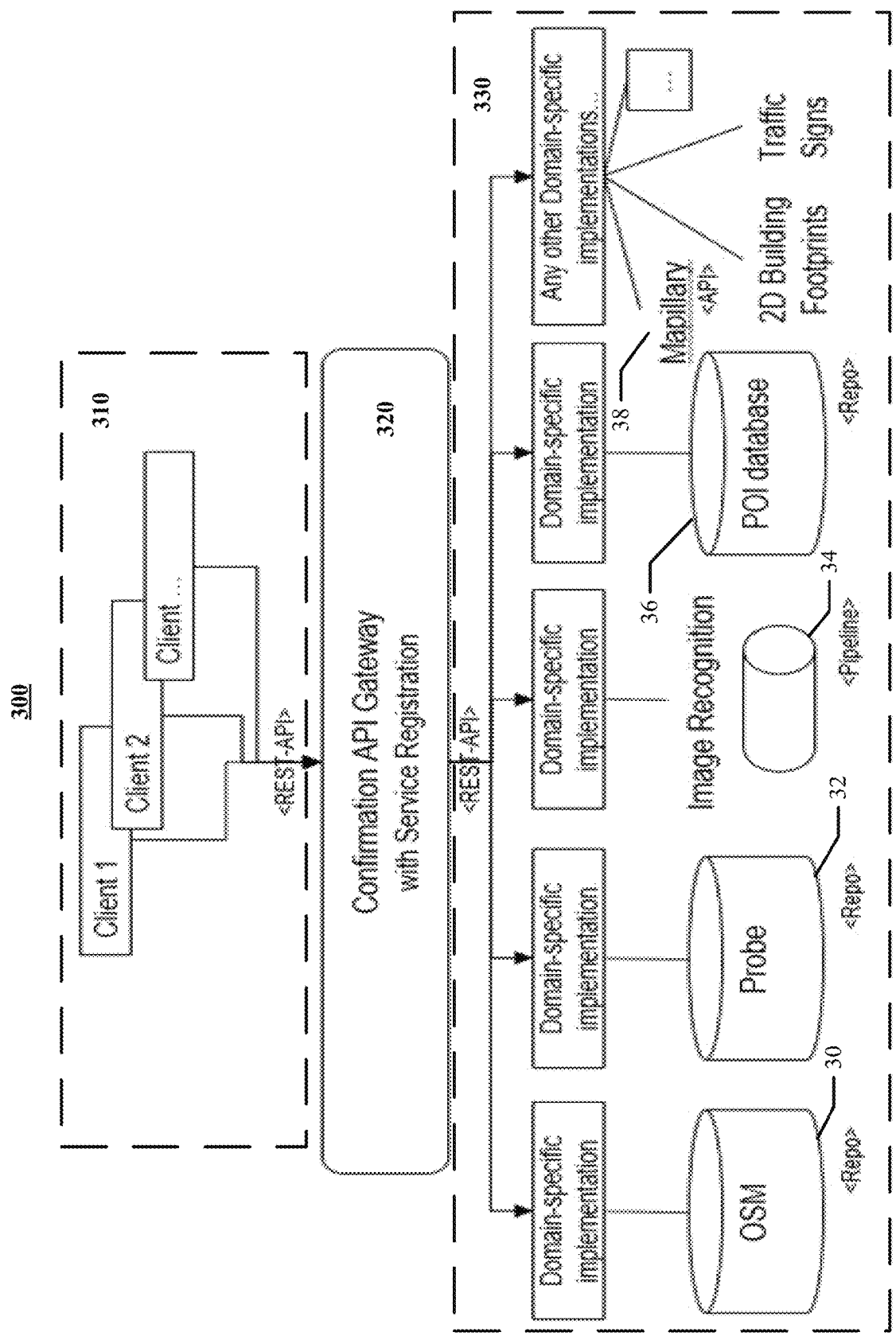

Having thus described certain example embodiments of the present disclosure in general terms, reference will hereinafter be made to the accompanying drawings, which are not necessarily drawn to scale, and wherein:

FIG. 1 is a block diagram of an apparatus configured in accordance with an example embodiment of the present disclosure;

FIG. 2 is a flowchart illustrating the operations performed, such as by the apparatus of FIG. 1, in accordance with an example embodiment of the present disclosure; and FIG. 3 illustrates a system including an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Various methods and apparatus are provided in accordance with an example embodiment of the present invention for cross-checking the reliability of data. In an example embodiment, the methods and apparatus are provided for verifying the reliability of geographic-related information. Data collected by multiple users, such as through crowdsourcing, has the benefit of allowing data aggregators more data points to use in their data compilations, but increases the risk of inaccurate data creating inaccurate data compilation. As described below, the method and apparatus of an example embodiment implements a layered approach to the verification of data using one or more knowledge providers, who have information that is used to verify the pending data.

The apparatus may be embodied by a variety of different computing devices. For example, the apparatus may be embodied by one or more servers, personal computers, computer workstations, image processing systems, Application Programmer Interfaces (API) providing access to otherwise stored data or the like. In one embodiment, the apparatus is embodied by, associated with or in communication with a confirmation gateway as described below. Regardless of the type of computing device that embodies the apparatus, the apparatus of an example embodiment is depicted in FIG. 1 and includes or is otherwise associated with processing circuitry 12 including, for example, a processor 14 and memory 16, and optionally a user interface 20 and/or a communication interface 20 for interacting with the processing circuitry.

In some embodiments of the processing circuitry 12, the processor 14 (and/or co-processors or any other circuitry assisting or otherwise associated with the processor) may be in communication with the memory device 16 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device therefore serves as a computer-readable storage medium, which refers to a physical storage medium (e.g., volatile or non-volatile memory device), and is differentiated from a computer-readable transmission medium, which refers to an electromagnetic signal. The memory device may be configured to store information, data, content, applications, instructions, or the like for enabling the apparatus to carry out various functions in accordance with an example embodiment. For example, the memory device could be configured to buffer input data for processing by the processor. Additionally or alternatively, the memory device could be configured to store instructions for execution by the processor.

The processor 14 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment may also optionally include a communication interface 20 that may be any means such as a device or circuitry embodied in either hardware or a combination of hardware and software that is configured to receive and/or transmit data from/to other electronic devices in communication with the apparatus, such as by near field communication (NFC) or other proximity-based techniques. Additionally or alternatively, the communication interface may be configured to communicate via cellular or other wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication for vehicle to vehicle or vehicle to infrastructure wireless links. In example embodiments, the communication interface may receive and transmit data from vehicles nearby.

The apparatus 10 may support a mapping or navigation application so as to present maps or otherwise provide navigation or driver assistance, such as in an example embodiment in which map data is created or updated. In order to support a mapping application, the computing device may include or otherwise be in communication with a plurality of knowledge providers that include one or more geographic databases, such as may be stored in memory 16 or communicated through a network. For example, a geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or Global Positioning System (GPS) data associations (such as using known or future map matching or geo-coding techniques), for example. Furthermore, other positioning technology may be used, such as electronic horizon sensors, radar, Light Detection and Ranging (Li-DAR), ultrasonic and/or infrared sensors.

Referring now to FIG. 2, the operations performed by the apparatus 10 of an example embodiment of the present invention includes means, such as the processing circuitry 12, the processor 14 or the like, for cross-checking the reliability of data. In an example embodiment, detailed herein, the methods and apparatus could be used in relation to data collected by vehicles. As shown in block 200 of FIG. 2, the apparatus 10 includes means, such as the processing circuitry 12, the processor 14 or the like, for receiving a client request. In some embodiments, the client request may be received by a confirmation gateway 320, such as the processor 14 of apparatus 10. A client request may be sent by a client, which may be any possessor of data with questionable or unknown reliability or for which the processor of the data wants to verify the reliability of the data. In some examples, the client request may be sent by the user or machine that collects the data (e.g., an autonomous vehicle may send data from one of its sensors to the apparatus of an example embodiment of the apparatus to determine the reliability) or by another third party who has received the data from another (e.g., a mapping service may receive data from a user and then want to verify it before combining the data with other user data).

In addition to requesting verification of the data, a client request may include the data to be verified or an indication as to the where the data is located. Various types of data may be submitted for verification including, for example, data in the form of geographic-related information, such as geographic-related information relating to roadways, traffic along roadways, or the like. In this regard, the data associated with a client request may include geographic-related information associated with a specific location. In some embodiments, the confirmation gateway, such as the processor 14 of the apparatus 10, may receive multiple client requests at the same or close to the same time. Some client requests may contain multiple data types, such as a plurality of geographic-related information for one or more specific locations. For example, a vehicle may track geographic-related information in the form of both traffic and road conditions simultaneously. In some instances, only one verification will be needed for multiple data types collected at a specific location. Alternatively, each data type collected at a specific location may have an independent confidence level and, as such, need to be separately verified. The geographic-related information that is received may relate to various features, such as construction, natural changes, and the like that occur at a specific location along a roadway, and/or to traffic conditions at a specific location along a roadway. The client requests may come from an individual user device, such as a mobile phone, that collects the geographic-related information in the first place or from a data aggregator or other type of client. In various embodiments, the data included in the client request may vary. In some cases, only a portion of the geographic-related information may be transmitted to the confirmation gateway in order to reduce the demand on the network (e.g., the portions of the data in the form of geographic-related information needed to determine a confidence level may be transmitted and other information, such as data used to actually update the map, is not). The client request may be transmitted through the network as described in FIG. 3.

Referring now to Block 210 of FIG. 2, the apparatus 10 includes means, such as the processing circuitry 12, the processor 14 or the like, for identifying one or more knowledge providers to determine one or more confidence levels for the data of the client request based on a type of the geographic-related information associated with the specific location. The knowledge providers may be any possessor of location-based data that is in communication with the confirmation gateway. The knowledge providers and the confirmation gateway may be hosted and operated independently. In other embodiments, however, one or more knowledge providers may be housed by the confirmation gateway, such as in the memory 16. In some embodiments, there is an initial connection between the confirmation gateway and one or more of the knowledge providers. At this point, the knowledge provider may provide information indicating the types of data and/or locations from which the data is obtained for which knowledge providers can provide verification services to the confirmation gateway.

In some embodiments, there may be one or more primary knowledge providers. In such embodiments, the one or more primary knowledge providers may be based on the geographic-related information included in the client's request. Alternatively, one or more primary knowledge providers may be designated as a primary knowledge provider for all geographic-related information received by the confirmation gateway. In some embodiments, there may be a hierarchy of knowledge providers. In such cases, the hierarchy of knowledge providers may affect the order in which geographic-related information is provided to the knowledge providers. Additionally or alternatively, the hierarchy of knowledge providers may affect the weight given to each confidence level returned by the knowledge providers.

The knowledge providers may register with the confirmation gateway, such as via a registration communication. In various embodiments, the registration communication can be performed once, such as at the time of initial communication, or may be updated repeatedly, such as continuously or periodically. The registration communication may include registration information, such as metadata, transmitted by the knowledge providers to the confirmation gateway. The metadata from the knowledge providers may be received and used by the confirmation gateway, such as the processor 14 of apparatus 10, to determine whether a client data should be sent to a respective knowledge providers for analysis. The metadata may relate to the data type, specific locations from which data is collected, or the like, for which each knowledge providers can produce a confidence level.

Thus, the metadata produced by a knowledge provider defines a data profile for which the knowledge provider is able to provide verification services. The apparatus, such as the processing circuitry 12, the processor 14, or the like, can compare the attributes of the data, such as the type of data, the location associated with the data, or the like, for which a client request for verification has been received to the data profile associated with each knowledge provider to determined one or more knowledge providers configured to provide verification services for the data associated with the client request. In some embodiments, there may be no information, such as metadata, transmitted by one or more of the knowledge providers that defines the data for which the knowledge provider provides verification services. In this instance, the confirmation gateway, such as the processor 14 of the apparatus 10, provides the geographic-related information to all of the knowledge providers seeking verification. In some embodiments, some of the knowledge providers provide registration information, while others may not. In such cases, the confirmation gateway, such as the processor 14 of the apparatus 10, may send the geographic-related information associated with every client request to the knowledge providers that do not send registration information (along with the knowledge provider(s) that did provide registration information and have a profile that includes data in the form of the geographic-related information). However, the verification services provided by the knowledge providers that did not provide registration information may receive less weight than the verification services provided by other knowledge providers that did provide registration information when determining a combined confidence level, as discussed below. In some embodiments, the registration information is in the form of metadata and be used by the confirmation gateway, such as the processor 14, for routing client requests to corresponding knowledge providers, evaluating the client's request, and/or keeping the confirmation gateway and the knowledge providers connected to one another.

The determination by the confirmation gateway, such as the processor 14 of the apparatus 10, as to which knowledge providers from which to seek verification services may be a simple operation including at least one of point of interests (POI), traffic signs, or the like. In some cases, the client request may not contain enough information, or the information may not be readily available to the confirmation gateway, for the confirmation gateway to determine which knowledge providers to receive the geographic-related information for verification purposes. In such an example, the confirmation gateway, such as the processor 14 of the apparatus 10, may be configured to perform a specific function, such as providing the geographic-related information to all knowledge providers or a specific group of knowledge providers that may be able to create a confidence level. In some embodiments, the confirmation gateway, such as the processor 14 of the apparatus 10, may choose a knowledge provider to which the geographic-related information is sent based on the data in the form of the geographic-related information matching the data profile for which the knowledge provider is able to provide verification services. In some instances, however, only one parameter, such as file type, is considered in identifying a knowledge provider (e.g., if the client request relates to a picture file, the picture file may be sent to an image recognition knowledge provider regardless of whether the type of data in the picture is known).

Once the initial connection has been made and the registration communication has been made, some embodiments of the apparatus 10 may allow knowledge providers to be disconnected and reconnected without having to repeat the connection process again. In such a case, the knowledge providers may supply sufficient information upon reconnecting to permit the confirmation gateway, such as the processor 14 of the apparatus 10, to identify the initial connection and the registration information (e.g., the knowledge providers may have and provide an identification number, either supplied by the confirmation gateway, such as the processor 14 of the apparatus 10, or otherwise, that will allow the confirmation gateway to recognize the knowledge provider). In some embodiments, the confirmation gateway, such as the processor 14 of the apparatus 10, may be configured to automatically recognize certain knowledge providers without having an initial registration communication. For example, certain knowledge providers may be standardized, well-known, or otherwise predefined, such that the confirmation gateway, such as the processor 14 of the apparatus 10, expects that such a knowledge provider will be attached and configured with a predefined profile for verification services and therefore is programmed to discover the knowledge provider automatically. In various embodiments, the knowledge providers may access the location-based data used for the verification differently. In some embodiments, the knowledge providers may contain the location-based data, while other knowledge providers may not actually contain the location-based data but instead be in communication with such a database that includes the location-based data.

In some embodiments, there may only be one knowledge provider that can verify data, such as by producing a confidence level, for given geographic-related information associated with a specific location. In such a case, the confirmation gateway, such as the processor 14 of the apparatus 10, may determine to cause the transmission of the geographic-related information to the knowledge provider. In other embodiments, more than one knowledge providers may be able to verify data, such as by producing a confidence level for the given information at a specific location. In such cases, the confirmation gateway, such as the processor 14 of the apparatus 10, may choose one knowledge providers, either randomly (e.g., there may be revolving order based on which knowledge providers have been used recently) or intentionally (e.g., one knowledge providers may be "preferred" compared to others), to provide verification services by producing a confidence level for the geographic-related information for the client request. In other embodiments, the confirmation gateway, such as the processor 14 of the apparatus, may choose multiple knowledge providers that can provide verification services by producing a confidence level. In such an example, the confirmation gateway, such as the processor, may designate a hierarchy of the knowledge providers that are chosen. For example, one knowledge providers may be designated as the primary knowledge provider with the other knowledge providers only accessed (in hierarchical order) if the prior knowledge providers were unable to provide verification services. Alternatively, all knowledge providers may be given equal weight in which case, all knowledge providers may be asked to provide verification services and the resulting confidence levels provided by the knowledge providers may be combined by the apparatus, such as by the processor 14, such as being averaged, forming a weighted average, or the like. In some embodiments, all of the knowledge providers that receive the geographic-related information from the confirmation gateway and the confirmation gateway, such as the processor 14 of the apparatus

10, calculate and provide a confidence level independent of the confidence levels provided by the other knowledge providers.

In an example embodiment, when there are no knowledge providers that can provide a confidence level for the geographic-related information associated with a specific location, the apparatus 10, such as the processor 14, may be configured to send the geographic-related information to a knowledge provider that provides verification services, including confidence levels, for the same type of geographic-related information at similar locations, e.g., same type of roadway. For example, information maintained by a knowledge provider for a portion of a highway may be used to create a confidence level for geographically-related information for a different stretch of highway for which the knowledge provider does not yet have sufficient information. These confidence levels may be flagged when transmitted back to the client in order to alert the client that the confidence level is based on information from a different, but similar location. Additionally or alternatively, the confidence level may be normalized based on the differences between the location at issue and the similar location that is used for verification purposes (e.g., a first stretch of highway may be 75% similar to a second stretch and therefore the confidence level would be reduced by the factor of 0.75 when the first stretch is used for comparison of the second stretch).

Referring now to Block 220 of FIG. 2, the apparatus 10 includes means, such as the processing circuitry 12, the processor 14 or the like, for causing the transmission of at least some of the geographically-related information from the client request to the one or more knowledge providers. In various embodiments, the confirmation gateway, such as the processor 14 of the apparatus 10, may be connected to or in communication with one or more knowledge providers. Some knowledge providers may be connected to or be a part of the confirmation gateway, such as stored in the memory 16. Other knowledge providers may be connected using proximity based connections, such as NFC or Bluetooth, via cellular, or other wireless protocols. All transmissions of the geographically-related information to one or more knowledge providers may occur at the same time. Alternatively, the transmissions of the geographically-related information to one or more knowledge providers may be staged (e.g., some transmissions are sent to certain knowledge providers before other knowledge providers). Such staging may be due to the hierarchy of knowledge providers (e.g., the apparatus may transmit the information to the primary knowledge providers first with the transmission to the other knowledge providers occurring subsequently). The number of transmissions of geographic-related information is based on the number of knowledge providers determined by the confirmation gateways, such as the processor 14 of the apparatus 10. For example, if the confirmation gateway, such as the processor 14 of the apparatus 10, determines that there are three knowledge providers to create confidence levels pursuant to data profiles that match the geographically related information, then the confirmation gateway, such as the processor 14 of the apparatus 10, will cause three transmissions of the client information, one to each knowledge provider.

Referring now to Block 230 of FIG. 2, the apparatus 10 includes means, such as the processing circuitry 12, the processor 14 or the like, for receiving the one or more confidence levels of the geographic-related information from the knowledge providers. The confidence level may be an indication of the reliability of the geographic-related information that was received from a client. The confidence level may be numerical (e.g., a percentage from 0 to 100). The confidence levels may be created by the one or more knowledge providers. Each knowledge providers may provide a confidence level for the geographic-related information associated with a specific location. A knowledge provider may provide a plurality of confidence levels for similar geographic-related information captured at various points along a roadway (e.g., there may be multiple confidence levels for data taken along a specific stretch of road with each confidence level associated with a different location along the roadway).

The reliability of the geographic-related information may be based on a comparison of the geographic-related information to one or more data points at a given location that are known to be accurate or to otherwise have a predefined accuracy. For example, a knowledge provider may use data from other users or other predefined data for comparison purposes to create a confidence level. The data used by the knowledge provider to create the confidence level may have varying predefined degrees of reliability, which may affect the confidence level created. In some embodiments, the reliability may also be based, at least in part, on the type of data, historical trends, real time geographic-related information from others, or the like. For example, if a knowledge provider has received requests for verification services from ten clients that all had the same or similar information, then the confidence level may be increased as it is less likely that multiple clients will all have inaccurate information.

The method of comparing the geographic-related information to the known data associated with a specific location may be different based on the type of geographic data being compared. For example, traffic information may only look to see that a vehicle's tracking device (e.g., Global Positioning System (GPS)) is indeed at a given location, while geographic-related information in a picture may require image recognition processes to be completed in order to create the confidence level. In some cases, the confidence level is affected by the amount of information that is provided by the client (e.g., the client may only give a portion of the actual geographic-related information that is being verified and therefore, the accuracy of a predicted confidence level may be affected, such as by being reduced when less data is provided). Various knowledge providers may have varying degrees of reliability, which may affect the confidence levels determined by the confirmation gateway, such as the processor 14 of the apparatus 10, in response to the confidence level provided by the knowledge providers. For example, some knowledge providers may have inflated confidence levels compared to either reality or other knowledge providers and therefore the inflation is taken into account when the apparatus 10, such as the processor 14, determines the reliability of the data.

In various embodiments, individual knowledge providers may act as either a repository, a pipeline, or the like. Repositories may contain memory, either as a part or separate from the memory 16 in the apparatus, which holds information relating to the type of data from which it can produce a confidence level. A repository may be embodied as one or more databases. For example, the repository may contain information relating to the average speed of traffic along a given road at a given time. The geographic-related information provided to the repository should be in the format that the repository understands (e.g., for location-based operations, the location must be readily accessible). In an example embodiment, a repository may only compare the geographic-related information from the client request to the geographic-related information in the repository's database of a known accuracy in instances where the geographic-related information is in a certain format. Alternatively, if the geographic-related information is not in the certain format, the repository may return an error message or an inaccurate confidence level. For example, the confirmation gateway, such as the processor 14 of the apparatus 10, may provide a repository with geographic-related information in a format that allows the repository to readily retrieve the corresponding data in the database. The repository may then compare the retrieved data and the geographic-related information to create a confidence level. Example repositories are shown in FIG. 3 and include a POI database 36 with content from a third party provider, collected probe data 32, mapping services, such as OpenStreetMap® (OSM) 30, and the like. Any source with spatial data or location related content can act as knowledge provider and thus be used as a confirmation for the client provided geographic-related information. Possible knowledge providers may be accessible via APIs, such as Mapillary®, Foursquare®, Facebook®, photography data bases or another location related API. Furthermore, a knowledge provider can also consist of algorithms to check the reliability of the data by more sophisticated methods. The confirmation gateway may not differ operation between a pipeline provider and a data repository. The decision of whether to send geographic-related information to a pipeline provider, a data repository, either, or both can also be made by the requesting client.

Alternatively, knowledge providers may be embodied as pipelines to perform a process on the geographic-related information based on an underlying database to determine the proper information for comparison with the geographic-related information from the client. The process performed may be algorithmic. The pipeline may be an Extract, Transform, Load (ETL) pipeline. The pipeline may be connected to one or more databases, such as a repository discussed above. The pipeline may perform an operation on the geographic-related information from the client to determine the data to be used for comparison purposes. An example embodiment of a pipeline knowledge provider is an image recognition knowledge provider 34. For example, a picture of a geographic feature may not be tagged with identifying features (e.g., there was no GPS coordinates provided with the picture) and the image recognition pipeline must determine the location from the picture itself before being able to find the corresponding information to which the geographic-related information can be compared. Examples for other knowledge provider pipelines include name recognition of POIs using street level imagery, frequency analysis of visitors using WIFI check-ins, and the like.

Referring now to optional Block 240 of FIG. 2, the apparatus 10 includes means, such as the processing circuitry 12, the processor 14 or the like, for causing the transmission of a signal based on the one or more confidence levels. In such embodiments, the confirmation gateway, such as the processor 14, may cause the transmission of the individual confidence levels to the client(s). Alternatively, the confirmation gateway, such as the processor, may create other indicators based on the confidence levels that do not actually include the raw confidence level. The other indicators may include ratings of reliability (e.g., on a scale of 0-10), visual representation (e.g., green light means reliable), or the like. In various embodiments, the apparatus 10 may be configured to present the results in a certain way (e.g., an apparatus may only provide one raw confidence level). Alternatively, the client may be able to define for the confirmation gateway the amount of data relating to the confidence level received and the method of delivery (e.g., client may choose only to get a pass or fail, or may want the exact confidence level).

The signal may be transmitted to a client, such as a driver in a vehicle, or a data aggregator that uses data, such as large scale data, to create reliable mapping services or the like. The signal may be in the form of numerical information relating to the confidence level, or may be an indication about the reliability of the geographic-related information being collected. For example, if the confidence level is above a certain threshold, the only signal provided back to the client may be a "pass" or other type of indication that the data may be used reliably. In such cases, the threshold of reliability may be set by the client (e.g., a data aggregator may only feel comfortable using 85% confidence level data) or the apparatus (e.g., the apparatus may implement a standard confidence level that is sufficient for a certain level of reliability). Alternatively, the client may receive information indicating that the geographic-related information does not meet the threshold level of confidence set. For example, the geographic-related information may have a low confidence level and the client may then discard the geographic-related information instead of using the geographic-related information. The apparatus may be in communication with clients via a wired connection, a wireless connection, or a combination thereof. In an example embodiment, the apparatus, such as the communication interface 20, may be in communication with a client through a network using a proximity based protocol, such as near field communication (NFC) or Bluetooth. Alternatively, the apparatus, such as the communication interface 20, may be in communication with the client through a network using cellular or other wireless protocols including Global System for Mobile Communications (GSM), such as but not limited to Long Term Evolution (LTE). In various embodiments, different clients may be in communication with the apparatus in different ways (e.g., some clients may be connected using NFC and others may use LTE).

In some embodiments, the confirmation gateway, such as the processor 14, may compile the confidence levels together into a combined confidence level prior to transmission to a client. The combined confidence level may be simple averaging of each confidence level or may have each confidence level weighted based on the hierarchy of the knowledge providers, if one was determined (e.g., the confidence level returned by the primary knowledge provider may be weighted more than the confidence levels returned by other knowledge providers). In some embodiments, the confidence level created by the primary knowledge provider may be compared to the confidence levels created by other knowledge providers to determine the variance of the confidence level. In such a case, if the variance is within an allowable range, then the confidence level of the primary knowledge provider may be used by the confirmation gateway, such as the processor 14 of the apparatus 10, without further reference to the other confidence levels. Alternatively, when a variance larger than an allowable level exists, the confidence levels of the other knowledge providers may be factored in, such as by averaging the confidence levels, when determining the signal to send based on the confidence level. As discussed below, the confirmation gateway, such as the processor 14 of the apparatus 10, may use the confidence level to determine the signal to provide to the client. Once a client receives the signal, it may then be displayed to the user or may be acted upon in an automated fashion.

In some embodiments, the method of cross-checking data may be repeated on a large scale, such as by data aggregators. For example, the data, once it is determined to be a certain confidence level, may be combined by the confirmation gateway, such as the processor 14 of the apparatus 10, with other previously cross-checked user data and then utilized by knowledge providers during the subsequent provision of verification services. The repeatability of the method of cross-checking allows for scaling. This scaling allows data aggregators to use the information to create reliable data, such as for mapping and traffic applications. In some embodiments, the users of a navigation mapping service may provide data of questionable reliability. The provided data may have a confidence level determined using an example embodiment. After the confidence level has been determined, the unreliable data points (e.g., less than 75% confidence level) may be disregarded (e.g., the unreliable data points may be deleted or stored for future use). The reliable data points may then be aggregated in a reliable way. While applicable to various types of data, the data that is subjected to the verification process may be crowd-sourced data, such as relating to mapping services such as traffic and road conditions.

Referring now to FIG. 3, a layered schematic of the system including an example embodiment of the present disclosure is provided. In various embodiments, portions of the confirmation gateway 320 and the knowledge providers 330 are embodied by an example apparatus 10, such as shown in FIG. 1. There may be multiple clients connected to the confirmation gateway through a system architecture that allows interoperability of computers, such as a Representational State Transfer (REST) Application Program Interface (API). The knowledge providers may be connected using the same system architecture, such as a REST API. The clients that send information to the confirmation gateway, such as the processor 14 of the apparatus 10, may send this information through different mechanisms, such as cellular or proximity based protocols, such as NFC or Bluetooth. In some cases, some clients may transfer information first to another client, who interacts directly with the confirmation gateway. In various embodiments, both clients and knowledge providers may be under the same control as the confirmation gateway or may be under third party control. In some embodiments, clients may include any application that requires and/or desires a cross check of its geographic-related information. For example, an application may require a defined filtering and routing of the request to a corresponding knowledge provider by the confirmation gateway. In such an example, the gateway may interact as a broker between the client and the knowledge provider(s).

As discussed in more detail in reference to FIG. 2, a confirmation gateway 320 may be located between the clients 310 and knowledge providers 330. The confirmation gateway may be embodied as an API. The API may be installed either on a multipurpose computing device, such as a mobile phone, or a dedicated device. The confirmation gateway, such as the processor 14 of the apparatus 10, may have a registration process with the client, similar to the registration with the knowledge providers, in which the client provides initial information about the geographic-related information to be provided. Alternatively, a client may not send any initial information and instead only sends the geographic-related information to be cross-checked. The method of communicating the geographic-related information to the confirmation gateway may utilize the same technique as that by which the signal reporting the one or more confidence levels is transmitted, including proximity based communication protocols, such as NFC or Bluetooth, cellular connections, or other wireless connections.

The knowledge providers 330, as discussed above, may be embodied as multiple different repositories or pipelines. The knowledge providers 330 of FIG. 3 are shown for example purposes. Other embodiments may have more or fewer knowledge providers in communication with the confirmation gateway 320, including different types of knowledge providers than those shown in FIG. 3. Each knowledge provider may be connected to the configuration gateway in the same manner, such as in a standardized manner. Alternatively, each knowledge provider may be connected to the confirmation gateway differently, such as through a domain-specific implementation. In some embodiments, each knowledge provider may utilize different methods for matching and finding the corresponding object, therefore the implementation of the knowledge provider may depend on the domain and the used methods to calculate the confidence level. In addition to the repositories and pipeline shown, other crowd-sourced collections of data, such as Mapillary services provided by Mapillary API 38, may be used to compare the client information. In some embodiments, the additional knowledge providers may utilize different methods and algorithms to realize the matching and calculating the confidence level than those utilized by other knowledge providers. In some embodiments, the different knowledge providers may also be interconnected. For example, a pipeline, such as the image recognition pipeline, may be connected to one of the repositories in order to retrieve the proper corresponding data for comparison with the client geographic-related information after the pipeline process has successfully identified the location and/or data type of the client geographic-related information.

In an example embodiment, one or more knowledge providers may be embodied as a map database. The processor 14 may be in communication with a map database. The map database may be defined by the memory device 16, or may be remote, such as in the network, and connected to the processing circuitry, such as via the communication interface 20. In an example embodiment, the map database may provide information that may assist the apparatus to determine if an alteration in route of the vehicle is needed. The map database may include node data, road segment data or link data, point of interest (POI) data, or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as hospitals, police stations, fire stations, fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) also known as a context associated with the POI data records or other records of the map database. The map database may include data about emergency vehicles (e.g., typical routes, activities, speeds, high usage areas) with the POI data or other portions of the map database.

The map database may be a master map database stored in a format that facilitates updating, maintenance, and development. Although the map database may be any spatial database, the master map database or data in the master map database in one example embodiment can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device for example. The navigation-related functions can correspond to vehicle navigation, pedestrian navigation, or other types of navigation.

As mentioned above, the map database may be a master geographic database stored or accessible on the server side. However, in alternate embodiments, a client side map database may represent a compiled map/spatial database that may be used in or with end user devices to provide navigation and/or map-related functions. For example, the map database may be used with the user equipment to provide an end user with navigation features. In such a case, the map database can be downloaded or stored on the user equipment which can access the map database through a wireless or wired connection, such as via a processor 14 and/or the network, for example.

Additionally or alternatively, the map database may include historical data relating to past traffic conditions, previous vehicle routes, previous emergency vehicle routes, or the like. This data may be used to determine the projected route of an emergency vehicle. For example, in situations where there is a high level of criticality, an ambulance may take the quickest route to a hospital, while in a lower level of criticality, the ambulance may take a longer, safer route. This historical data may be updated or remain static. The map database may also be a compilation of databases used to aid the processing server 14 in determining whether the vehicle should alter the projected route. The map database may be contained in the processing circuitry 12 may be connected to the processing circuitry through the network.

Various methods and apparatus are provided in accordance with an example embodiment of the present invention for cross-checking the reliability of data. In an example embodiment, the methods and apparatus are provided for verifying the reliability of geographic-related information. Data collected by multiple users, such as through crowd-sourcing, has the benefit of allowing data aggregators more data points to use in their data compilations, but increases the risk of inaccurate data creating inaccurate data compilation. As described above, the method and apparatus of an example embodiment implements a layered approach to the verification of geographic-related information using a confirmation gateway, such as the processor 14 of the apparatus 10, determining the one or more knowledge providers, who have information that is used to verify the pending data, to have determine a confidence level. The confirmation gateway, such as the processor 14 of the apparatus 10, may then return an indication of the reliability of the geographic-related information to the client.

As described above, FIG. 2 illustrates a flowchart of an apparatus 10, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 16 of an apparatus employing an embodiment of the present invention and executed by the processing circuitry 12, the processor 14 or the like of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for cross-checking reliability of data, the method comprising:
   receiving a client request containing data in the form of geographic-related information associated with a specific location;
   identifying two or more knowledge providers from a plurality of knowledge providers based on at least one data type of a respective data profile of the two or more knowledge providers matching at least one data type of the geographic-related information associated with the specific location, wherein (a) the two or more knowledge providers comprises a primary knowledge provider, (b) each knowledge provider of the plurality of knowledge providers is configured to determine one or more confidence levels for instances of data associated with one or more data types matching those of the respective data profile, and (c) the one or more data types comprise a data format of the geographic-related information associated with a specific location;
   causing the transmission of at least some of the geographic-related information of the client request to each of the two or more knowledge providers;
   receiving a plurality of confidence levels of the geographic-related information, each confidence level of the plurality of confidence levels based on a comparison of the geographic-related information and a respective known resource associated with the specific location by a respective one of the two or more knowledge providers, wherein (a) each of the plurality of confidence levels corresponds to a respective numerical level of reliability corresponding to the geographic-related information and (b) the plurality of confidence levels comprises an initial confidence level determined by the primary knowledge provider;
   determining a variance of the plurality of confidence levels with respect to the initial confidence level;
   determining whether the variance of the plurality of confidence levels with respect to the initial confidence level is within an allowed range;
   responsive to determining that the variance of the plurality of confidence levels with respect to the initial confidence level is within the allowed range, setting an output confidence level equal to the initial confidence level;
   responsive to determining that the variance of the plurality of confidence levels with respect to the initial confidence level is not within the allowed range, setting the output confidence level equal to a combined confidence level determined based on the plurality of confidence levels; and
   providing an indication of the output confidence level, wherein the indication of the output confidence level is used to update a map database.

2. The method according to claim 1, wherein the combined confidence level is determined based at least in part on a weighted average of the plurality of confidence levels.

3. The method according to claim 1 further comprising receiving, from at least one of the two or more knowledge providers, information indicating the data profile for which the at least one of the two or more knowledge providers are capable of creating a confidence level.

4. The method according to claim 3, wherein the information also identifies one or more locations for which the at least one of the two or more knowledge providers are capable of creating the confidence level.

5. The method according to claim 1, wherein the one or more knowledge providers are pipelines or repositories.

6. An apparatus for cross-checking reliability of data, the apparatus comprising at least one processor and at least one non-transitory memory including computer program code instructions, the computer program code instructions configured to, when executed, cause the apparatus to:
   receive a client request containing data in the form of geographic-related information associated with a specific location;
   identify two or more knowledge providers from a plurality of knowledge providers based on at least one data type of a respective data profile of the two or more knowledge providers matching at least one data type of the geographic-related information associated with the specific location, wherein (a) the two or more knowledge providers comprises a primary knowledge provider, (b) each knowledge provider of the plurality of knowledge providers is configured to determine one or more confidence levels for instances of data associated with one or more data types matching those of the respective data profile, and (c) the one or more data types comprise a data format of the geographic-related information associated with a specific location;
   cause the transmission of at least some of the geographic-related information of the client request to each of the two or more knowledge providers;
   receive a plurality of confidence levels of the geographic-related information, each confidence level of the plurality of confidence levels based on a comparison of the geographic-related information and a respective known resource associated with the specific location by a respective one of the two or more knowledge providers, wherein (a) each of the plurality of confidence levels corresponds to a respective numerical level of reliability corresponding to the geographic-related information and (b) the plurality of confidence levels comprises an initial confidence level determined by the primary knowledge provider;
   determine a variance of the plurality of confidence levels with respect to the initial confidence level;
   determine whether the variance of the plurality of confidence levels with respect to the initial confidence level is within an allowed range;
   responsive to determining that the variance of the plurality of confidence levels with respect to the initial confidence level is within the allowed range, set an output confidence level equal to the initial confidence level;
   responsive to determining that the variance of the plurality of confidence levels with respect to the initial confidence level is not within the allowed range, set the output confidence level equal to a combined confidence level determined based on the plurality of confidence levels; and provide an indication of the output confidence level, wherein the indication of the output confidence level is used to update a map database.

7. The apparatus according to claim 6, wherein the combined confidence level is determined based at least in part on a weighted average of the plurality of confidence levels.

8. The apparatus according to claim 6, wherein the computer program code instructions are further configured to, when executed, cause the apparatus to receive, from at least one of the two or more knowledge providers, information indicating the data profile for which the at least one of the two or more knowledge providers are capable of creating a confidence level.

9. The apparatus according to claim 8, wherein the information also identifies one or more locations for which the at least one of the two or more knowledge providers are capable of creating the confidence level.

10. The apparatus according to claim 6, wherein the one or more knowledge providers are pipelines or repositories.

11. A method for cross-checking reliability of data, the method comprising:

receiving a client request containing a geographic-related information associated with a specific location;

coupling with at least one knowledge provider of a plurality of knowledge providers via a confirmation gateway to transmit data based on at least one data type of a respective data profile of the one or more knowledge providers matching at least one data type of the geographic-related information associated with the specific location, each knowledge provider of the plurality of knowledge providers configured to determine one or more confidence levels for instances of data associated with one or more data types matching those of the respective data profile, wherein the one or more data types comprise a data format of the geographic-related information associated with a specific location;

causing the transmission of the geographic-related information to at least one of the at least one knowledge provider coupled with the confirmation gateway based on the data profile provided from each knowledge provider; and providing an indication of a combined confidence level determined based on a plurality of confidence levels determined by the at least one knowledge provider that was transmitted the geographic-related information, wherein (a) the indication of the combined confidence level is used to update a map database, (b) each confidence level of the plurality of confidence levels corresponds to a respective numerical level of reliability corresponding to the geographic-related information, (c) the combined confidence level is determined based at least in part on a weighted average of the plurality of confidence levels, and (d) the indication of the combined confidence level is determined based at least in part on comparing the combined confidence level to a client-settable threshold.

12. The method according to claim 11 further comprising providing the client with information relating to the plurality of confidence levels, wherein the information provided to the client relating to plurality of confidence levels includes the combined confidence level.

13. The method according to claim 11, wherein the at least one knowledge provider comprises a primary knowledge provider which provides an initial confidence level of the geographic-related information.

14. The method according to claim 11 further comprising providing the client with information relating to plurality of confidence levels determined by the at least one knowledge provider.

15. The method according to claim 14, wherein the information received from the knowledge providers also includes one or more locations for which the at least one knowledge provider can create the confidence level.

16. The method of claim 1, wherein a respective knowledge provider of the two or more knowledge providers is configured to determine a normalized confidence level based on differences between the specific location and a similar location of the respective known resource.

17. The method of claim 1, further comprising, prior to providing the indication of the output confidence level, determining the indication of the output confidence level based at least in part on comparing the output confidence level to a client-settable threshold.

18. The apparatus of claim 6, wherein a respective knowledge provider of the two or more knowledge providers is configured to determine a normalized confidence level based on differences between the specific location and a similar location of the respective known resource.

19. The apparatus of claim 6, wherein the computer program code instructions are further configured to, when executed, prior to providing the indication of the output confidence level, determine the indication of the output confidence level based at least in part on comparing the output confidence level to a client-settable threshold.

20. The method of claim 11, wherein the indication of the combined confidence level provides information regarding whether the combined confidence level is at least equal to the client-settable threshold.

* * * * *